US008245573B2

United States Patent
Lammel

(10) Patent No.: US 8,245,573 B2
(45) Date of Patent: Aug. 21, 2012

(54) METHOD AND DEVICE FOR IDENTIFYING THE FREE FALL

(75) Inventor: Gerhard Lammel, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 687 days.

(21) Appl. No.: 12/224,517

(22) PCT Filed: Feb. 9, 2007

(86) PCT No.: PCT/EP2007/051240
§ 371 (c)(1),
(2), (4) Date: Aug. 3, 2009

(87) PCT Pub. No.: WO2007/099022
PCT Pub. Date: Sep. 7, 2007

(65) Prior Publication Data
US 2010/0046115 A1    Feb. 25, 2010

(30) Foreign Application Priority Data
Feb. 28, 2006   (DE) .......................... 10 2006 009 076

(51) Int. Cl.
*G01L 7/08*     (2006.01)
*H01H 35/24*    (2006.01)
*H01H 35/34*    (2006.01)
(52) U.S. Cl. ........................ 73/386; 200/83 A
(58) Field of Classification Search ..................... 73/386, 73/387; 200/83 A
See application file for complete search history.

(56) References Cited

U.S. PATENT DOCUMENTS

| 3,300,606 | A | * | 1/1967 | Starer et al. ................ 244/149 |
| 4,779,461 | A |   | 10/1988 | Gilman et al. |
| 4,858,856 | A | * | 8/1989 | Cloth ........................ 244/149 |
| 5,024,400 | A |   | 6/1991 | Cloth |
| 6,234,027 | B1 |  | 5/2001 | Schatz |
| 6,580,574 | B1 | * | 6/2003 | Codilian .................... 360/60 |
| 7,037,438 | B2 |  | 5/2006 | Benzel et al. |
| 7,059,182 | B1 | * | 6/2006 | Ragner ..................... 73/200 |
| 7,733,595 | B2 | * | 6/2010 | Lucas et al. ................ 360/75 |
| 2005/0080566 | A1 | * | 4/2005 | Vock et al. ................. 702/2 |

FOREIGN PATENT DOCUMENTS

| DE | 19701055 | 7/1998 |
| DE | 10032579 | 1/2002 |
| DE | 102004036032 | 7/2005 |
| DE | 102004036035 | 7/2007 |
| EP | 0281159 | 9/1988 |

(Continued)

OTHER PUBLICATIONS

International Search Report, PCT International Patent Application No. PCT/EP2007/051240, dated May 24, 2007.

*Primary Examiner* — Lisa Caputo
*Assistant Examiner* — Punam Roy
(74) *Attorney, Agent, or Firm* — Kenyon & Kenyon LLP

(57) ABSTRACT

A method and a device are described for preventing damage to a device as the result of a free fall. First a free fall of the device is identified, and a measure is then taken to protect the device from damage. The free fall is identified by detecting the ambient pressure. The device may have a hard disk in which the write/read head of the hard disk is parked and/or locked when the free fall is identified.

7 Claims, 2 Drawing Sheets

FOREIGN PATENT DOCUMENTS

| | | |
|---|---|---|
| GB | 2032860 | 5/1980 |
| GB | 2166584 | 5/1986 |
| JP | 2000-214035 | 8/2000 |
| JP | 2000-241442 | 9/2000 |
| JP | 2003-28825 | 1/2003 |
| JP | 2005-129172 | 5/2005 |
| WO | WO 0229812 | 4/2002 |

\* cited by examiner

METHOD AND DEVICE FOR IDENTIFYING THE FREE FALL

FIELD OF THE INVENTION

The present invention is directed to a method and a device for preventing damage to a device.

BACKGROUND INFORMATION

Portable electronic devices having integrated hard disks are being increasingly marketed in the entertainment industry. Devices of this type may be jarred or dropped during use, and the associated movement of the write/read heads may result in damage to the memory disks during operation and therefore loss of data.

To avoid damage of this type, three-axis acceleration sensors are typically used which are able to identify a free fall, and thus make it possible to move the write/read head into a parked position in a timely manner. A free fall is identified when an almost zero acceleration is measured on all three axes. However, detection of a free fall is problematic when the hard disk rotates about the center of gravity of the device and the sensor is situated outside the center of gravity. For a motion of this type, the acceleration sensor is able to measure a centrifugal acceleration, in which case the free fall cannot be identified. Complicated signal processing is necessary to also identify this motion. However, other motions are also possible which prevent a determination of the free fall as a function of the signal of an acceleration sensor. Thus, for a rotational speed $\omega$ and a distance r of the sensor from the center of gravity of the hard disk or of the device in which the hard disk is installed, the centrifugal acceleration $a=r*\omega^2$ would reach gravitational acceleration $g=9.81$ m/s$^2$ and therefore simulate a normal state. A signal of this type could be generated, for example, by providing a sensor at a distance of 2.8 cm from the center of gravity, the device rotating at 3 revolutions per second during the free fall. These parameters represent typical values for a falling MP3 player or cell phone.

In addition, the center of gravity of some devices changes during use. Thus, some mobile devices are equipped with folding or sliding mechanisms which make it impossible to position a permanently installed sensor unambiguously in the center of gravity. The same applies for devices whose center of gravity is situated outside the housing, which is the case for an opened laptop, for example.

SUMMARY

An object of the present invention is to detect the free fall of a device, preferably a hard disk, independently of a rotational motion of the device, using a sensor.

In accordance with the present invention, a method and a device are provided for preventing damage to a device as the result of a free fall. First a free fall of the device is identified, and a measure is then taken to protect the device from damage. According to the present invention, the free fall is identified by detecting the ambient pressure.

The free fall may be detected, independently of a rotational motion of the device, using a pressure variable which represents the ambient pressure. Furthermore, the complexity of evaluation is reduced by processing only one measured variable, in comparison to the measured signals from a known three-axis acceleration sensor.

A device whose free fall is to be identified may be, for example, an electronic device such as a laptop, an MP3 player, a PDA, a video camera, a cell phone, etc. All of these devices may contain hard disk memories, which, as the consequence of an impact after a fall, may lose data due to damage to the memory disk caused by the write/read head. It is therefore provided that, upon identification of a free fall of the device, the write/read head of the hard disk is locked, for example by parking the write/read head at the peripheral region or outside the memory disk. In this manner data loss resulting from the impact may be prevented.

The free fall is advantageously detected by a change in the pressure variable over time. This change over time may be used as a measure of the acceleration at which the device, i.e., the hard disk, is falling.

To prevent confusion of the free fall with other motions of the electronic device which routinely occur during use of the MP3 player, cell phone, etc., the pressure variable and/or the change of the pressure variable over time may be compared to a predefinable threshold value. When the threshold value is exceeded, a conclusion may be drawn that a free fall is present.

In one example refinement of the present invention, the pressure sensor is implemented in the device by use of a micromechanical diaphragm sensor. It is provided in particular that the sensor element of the diaphragm sensor is installed in a semiconductor substrate, and has capacitive or piezosensitive elements for pressure detection. The pressure sensor may be installed in the device in a very compact manner as the result of such miniaturization.

For identifying the free fall, an evaluation circuit is provided which detects and appropriately processes the measured signal of the pressure sensor. It may be provided that the evaluation circuit is integrated directly into the pressure sensor. When a micromechanical pressure sensor is used, it may additionally be provided that the evaluation circuit is mounted directly on the sensor element or near the sensor element on the semiconductor substrate, likewise using semiconductor processes. However, it may alternatively also be provided for the evaluation circuit to be mounted on a separate semiconductor chip and associated with the pressure sensor.

To conserve a battery present in the device, it may also be provided for the pressure sensor to be actuated in only a clocked manner, so that discrete pressure signals are generated.

Further advantages result from the following description of exemplary embodiments.

DETAILED DESCRIPTION OF EXAMPLE EMBODIMENTS

Because atmospheric pressure changes upon vertical motion, a falling motion may be deduced as the result of a corresponding detection of the ambient pressure. Based on the change over time $\Delta p$ of the air pressure p detected by the pressure sensor, the change in height $\Delta h=\Delta p/(g*\rho)$ may be determined, $\rho$ representing the density of air ($\rho$ is approximately 1.27 kg/m$^3$ at sea level). If time t in which the body falls in gravitational field g is determined at the same time, the change in air pressure may be used to deduce a free fall of the body.

Figure 1:
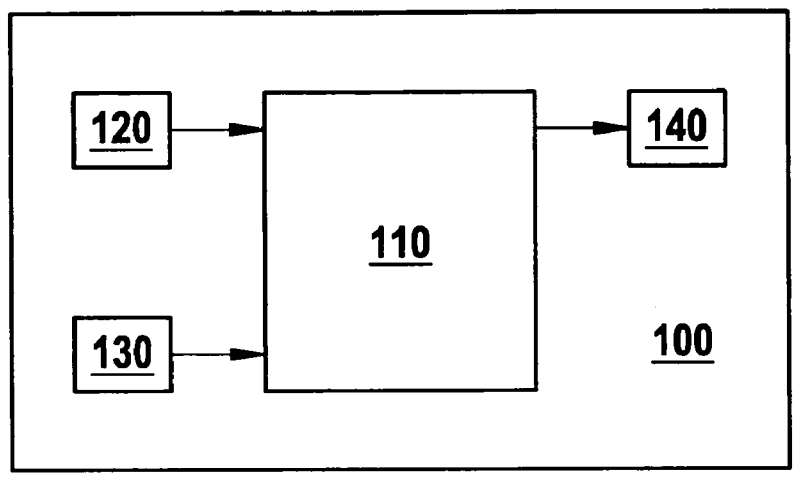
FIG. 1 schematically shows an example device according to the present invention.

FIG. 1 shows the device where a free fall is identified as block 100. This may be, for example, a laptop, an MP3 player, a PDA, a cell phone, or another electronic device which may be damaged by the impact after a fall. Hard disks in the referenced devices are particularly susceptible to damage from a fall, since as a result of the impact the write/read head may contact or even irreparably damage the memory disks. Such damage may result in data loss or impairment of the hard disk or the device. To prevent damage, it is therefore provided that the measured signals of a pressure sensor 120 are read into a control unit 110 in order to identify a free fall and, thus, an imminent impact. When control unit 110 detects the free fall, it initiates a measure which locks the write/read head of hard disk 140, for example by moving the write/read head to the periphery of the memory disk and locking it at that location.

Alternatively, it may also be provided that the signal of the pressure sensor is read into a separate evaluation circuit 130 for identifying the free fall. By using such an evaluation circuit 130 it is possible for control unit 110 to be informed only when a free fall is detected. This reduces the complexity of computations within the control unit.

Reliable detection of falls over small distances requires extremely accurate detection of the pressure. Specialized micromechanical diaphragm sensors composed of semiconductor materials, as described, for example, in German Patent Application Nos. DE 100 32 579 A1, DE 10 2004 036035 A1, or DE 197 01 055 A1, allow such detailed detection. Capacitive or also piezosensitive detection of the pressure may be used as a sensor element for the micromechanical pressure sensor. An electrical signal which is proportional to the detected pressure is provided as an output.

Figure 2A:
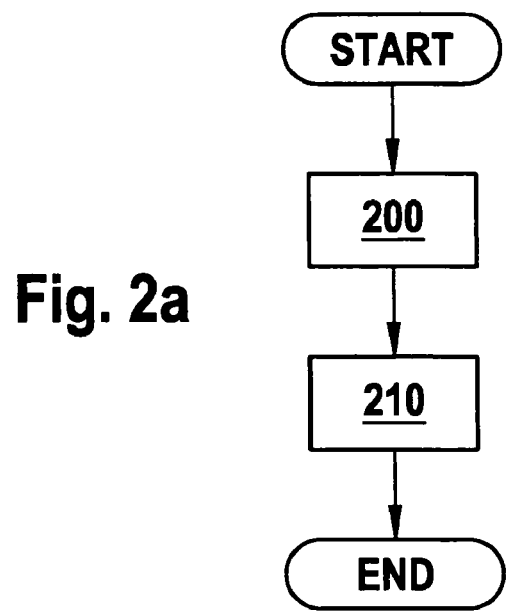
FIG. 2 illustrates a flow diagram for identifying a free fall as a function of the detection of a pressure variable.
Figure 2B:
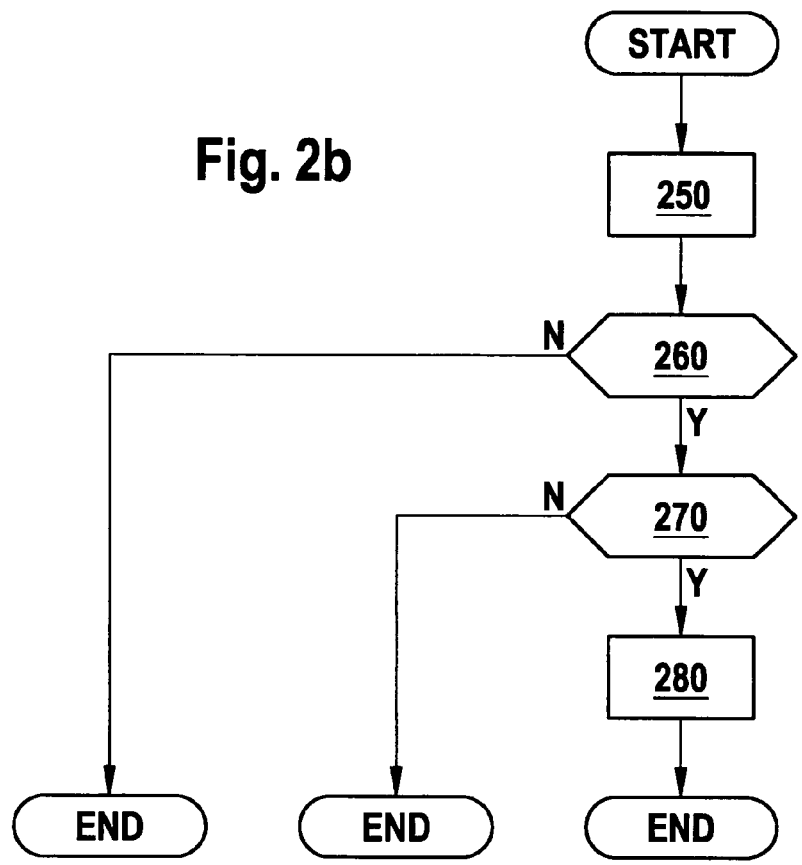

Algorithms which represent the detection of the pressure signal and identification of a free fall of device 100 are described in FIGS. 2a and 2b. Corresponding programs may run in control unit 110, for example. After starting, in step 200 as illustrated in FIG. 2a the first program component detects the pressure signal of pressure sensor 120. The pressure signal represents the ambient pressure of device 100, i.e., the atmospheric pressure. In step 210 the pressure signal is differentiated twice, i.e., is converted to the rate of change of pressure $d^2p/dt^2$ via a double time derivation. When the pressure signal is detected with appropriate accuracy, this variable may be used as a measure of the vertical acceleration of device 100. To this end, the rate of change of pressure $d^2p/dt^2$ is detected in a second program component as illustrated in FIG. 2b, and in step 260 is compared to lower and upper threshold values $SW_U$ and $SW_O$. If $d^2p/dt^2$ is outside the bandwidth specified by both threshold values $SW^U$ and $SW_O$, no free fall is identified and the program is terminated. By suitably selecting threshold values $SW_U$ and $SW_O$, normal vertical motions which may typically occur during use of the device may be distinguished from a free fall. However, if $d^2p/dt^2$ is between two limits $SW_U$ and $SW_O$, this indicates a free fall. In subsequent step 270 a check is made as to whether the state lasts for a given duration $t_{min}$ before the information is delivered in step 280 that a free fall is present. However, if value $d^2p/dt^2$ leaves range $SW_U<d^2p/dt^2<SW_O$ within a time $t<t_{min}$, the program is terminated. Time $t_{min}$ should be selected in such a way that on the one hand an incidental presence of condition $SW_U<d^2p/dt^2<SW_O$ may be unambiguously ruled out, while on the other hand the fall distance covered is still small enough to be able to perform appropriate measures to protect the device from damage.

The program is called up by the control unit at regular time intervals, for example several times per second, to check for free fall.

Figure 3:
FIG. 3 shows a possible evaluation circuit.

As mentioned above, the identification of the free fall may be carried out in a separate evaluation circuit. Such an evaluation circuit is described as an example, with reference to a further exemplary embodiment in FIG. 3. Starting from a pressure sensor 300, detected pressure signals p are identified in an intermediate memory 310 (a sample-and-hold element, for example). The signal thus obtained is electrically amplified, preferably using a low-noise preamplifier 320. Balancing of the sensitivity and smoothing of the signal may also be performed in this preamplifier before a time derivation of the processed pressure signal is carried out in block 330. As previously described for FIG. 2a, a double time derivation of the pressure signal is carried out to represent the change in pressure change (corresponding to the acceleration). If the pressure change increases, it may be assumed that the device is undergoing accelerated motion typical of a free fall. However, since it cannot be ruled out that the accelerated motion has been caused by normal use of the device, for example the up-and-down motion of a cell phone while jogging, a comparator is used in block 340. If an accelerated motion is detected between the lower and the upper threshold value of the comparator, a check is made in block 350 as to whether this accelerated motion lasts for at least a time $t_{min}$. Only then may a determination be made in block 360 that free fall is present.

The pressure sensor may be integrated into the housing or into a component of the device, for example, the cell phone. In the simplest case the pressure sensor requires only one power supply, and contains a digital output for signal evaluation. To conserve power for battery-operated devices, the power supply to the sensor element may be clocked, the signal for evaluation being stored in a sample-and-hold element, as described. Alternatively, the signal may also be evaluated in a strictly digital manner by using an analog-to-digital converter.

What is claimed is:

1. A method for preventing damage to an electronic device, comprising:
   identifying a free fall of the device; and
   taking a measure to protect the device from damage upon identification of the free fall;
   wherein the free fall is identified as a function of a sensor detected pressure variable which represents ambient pressure
   wherein the free fall of the device is detected as a function of a change in the pressure variable over time, at least one of the pressure variable and the change in the pressure variable over time is compared to a predefinable threshold value, and the free fall of the device is identified when the threshold value is exceeded,
   wherein the device has a hard disk and the measure is to lock a write/read head of the hard disk,
   wherein the sensor includes a micromechanical diaphragm sensor having a semiconductor substrate, and
   wherein the pressure sensor has capacitive sensor elements or piezosensitive sensor elements.

2. The method as recited in claim 1, wherein the arrangement includes an evaluation circuit, integrated into a pressure element of the pressure sensor, to identify the free fall of the device.

3. The method as recited in claim 1, wherein the pressure sensor at least one of: i) is activated in a clocked manner for detecting the pressure variable, and ii) generates digital pressure variables.

4. An electronic device, comprising:
an arrangement adapted to identify a free fall of the electronic device, and, upon identification of the free fall the device, adapted to take a measure to prevent damage to the device;
a pressure sensor adapted to detect a pressure variable which represents ambient pressure, the free fall being identified as a function of the detected pressure variable; and
a hard disk, wherein upon identification of the free fall, a write/read head of the hard disk being at least one of parked and locked;
wherein the arrangement is configured to detect the free fall as a function of a change in the pressure variable over time, to compare a change in the pressure variable over time to a predefined threshold value, and to identify the free fall when the threshold value is exceeded,
wherein the pressure sensor includes a micromechanical diaphragm sensor having a semiconductor substrate, and
wherein the pressure sensor has capacitive sensor elements or piezosensitive sensor elements.

5. The device as recited in claim 4, wherein the arrangement includes an evaluation circuit, integrated into a pressure element of the pressure sensor, to identify the free fall of the device.

6. The device as recited in claim 4, wherein the pressure sensor at least one of: i) is activated in a clocked manner for detecting the pressure variable, and ii) generates digital pressure variables.

7. The device as recited in claim 4, wherein the arrangement includes an evaluation circuit, integrated into a pressure element of the pressure sensor, to identify the free fall of the device, and wherein the pressure sensor at least one of: i) is activated in a clocked manner for detecting the pressure variable, and ii) generates digital pressure variables.

* * * * *